US011575723B2

(12) United States Patent
Rai

(10) Patent No.: US 11,575,723 B2
(45) Date of Patent: Feb. 7, 2023

(54) SMART SPEAKER MEDIA NETWORK SYSTEM AND METHOD

(71) Applicant: Woofy, Inc., New York, NY (US)

(72) Inventor: Arjun Rai, New York, NY (US)

(73) Assignee: Woofy, Inc., New York, NY (US)

( * ) Notice: Subject to any disclaimer, the term of this patent is extended or adjusted under 35 U.S.C. 154(b) by 128 days.

(21) Appl. No.: 17/354,029

(22) Filed: Jun. 22, 2021

(65) Prior Publication Data
US 2022/0407903 A1 Dec. 22, 2022

(51) Int. Cl.
*H04L 29/06* (2006.01)
*H04L 65/60* (2022.01)
*H04R 29/00* (2006.01)
*H04L 12/18* (2006.01)
*H04L 65/611* (2022.01)
*H04L 67/62* (2022.01)

(52) U.S. Cl.
CPC .......... *H04L 65/60* (2013.01); *H04L 12/1881* (2013.01); *H04L 65/611* (2022.05); *H04L 67/62* (2022.05); *H04R 29/001* (2013.01)

(58) Field of Classification Search
None
See application file for complete search history.

(56) References Cited

U.S. PATENT DOCUMENTS

| 11,455,658 | B1* | 9/2022 | Hubbard | G06Q 30/0201 |
| 2002/0090934 | A1* | 7/2002 | Mitchelmore | H04L 41/5054 |
| | | | | 455/412.2 |
| 2018/0068257 | A1* | 3/2018 | MacTiernan | G06Q 30/0242 |
| 2022/0217445 | A1* | 7/2022 | Nolan | H04N 21/8586 |
| 2022/0360608 | A1* | 11/2022 | Raleigh | H04L 63/10 |
| 2022/0394321 | A1* | 12/2022 | Barton | H04N 21/44226 |

* cited by examiner

*Primary Examiner* — Natisha D Cox
(74) *Attorney, Agent, or Firm* — Fresh IP PLC; John R. Bednarz

(57) ABSTRACT

A system receives smart speaker skill/application generation information generates a first smart speaker skill or application using the smart speaker skill/application generation information, receives at least one scheduled post to schedule at least one briefing at a scheduled time to be broadcast to a first plurality of smart speaker devices having the first smart speaker skill or application, receives tracking and analytics information from each smart speaker in the first plurality of smart speaker devices having the first smart speaker skill or application, and determines an audience for the at least one briefing comprising the first plurality of smart speaker devices having the first smart speaker skill or application and a second plurality of smart speaker devices having a second smart speaker skill or application different from the first smart speaker skill or application based on the tracking and analytics information.

20 Claims, 14 Drawing Sheets

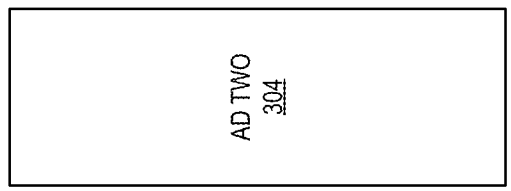
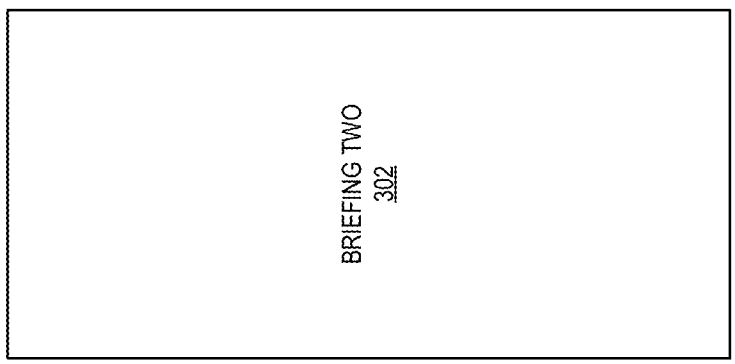
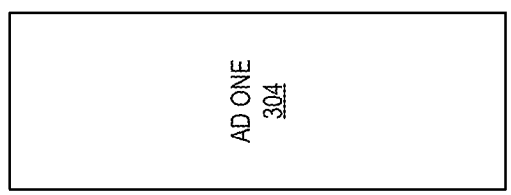
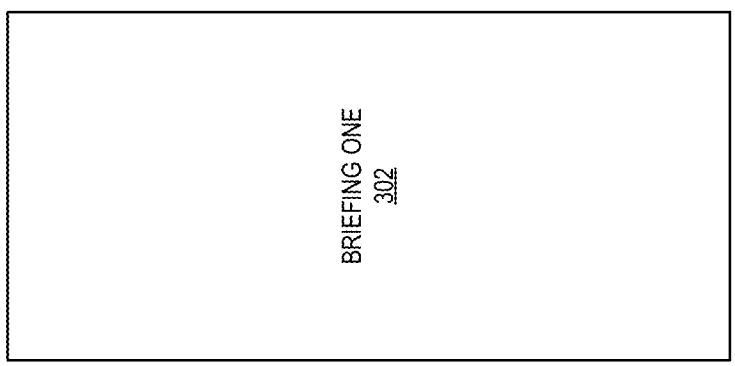
FIG. 3

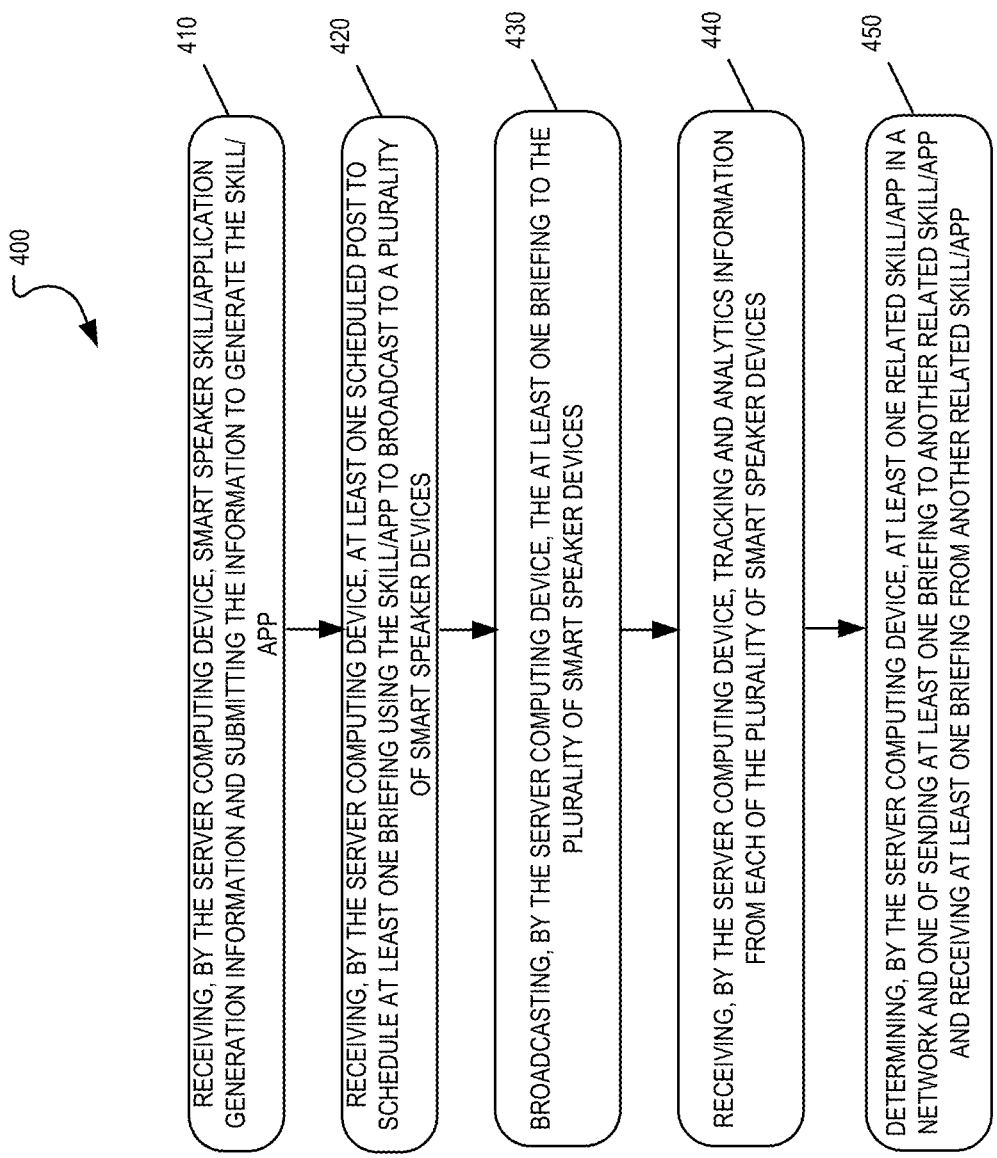

SMART SPEAKER MEDIA NETWORK SYSTEM AND METHOD

BACKGROUND

Companies and businesses use social media platforms to market their products and services. Although the social media networks provide the ability to reach customers throughout the world, it can be incredibly difficult to determine when, how, and what to post. In particular, social media marketers may have to determine what to post in a variety of different languages and determine creative ways to engage potential customers.

Recently, smart speaker devices have started to proliferate and are found in homes and businesses throughout the United States and world. Users can utilize these smart speaker devices to play music and other content. In addition, users can personalize and customize their smart speaker devices by installing applications or skills or subscribing to certain applications or skills.

It is with these issues in mind, among others, that various aspects of the disclosure were conceived.

SUMMARY

According to one aspect, a smart speaker scheduler system may include at least one client computing device, a server computing device having a smart speaker scheduler application, and a plurality of smart speaker devices, e.g., a smart speaker media network, that may receive scheduled content from one or more smart speaker skills or applications.

In one example, a user of the client computing device may create a smart speaker skill or application by sending information to the smart speaker scheduler application. The smart speaker scheduler application may receive the skill or application information from the user and automatically create the skill or application for the user. In one example, the smart speaker scheduler application may use an application programming interface (API) to communicate with another server computing device and generate the skill or application for the user.

Next, the user may create one or more media posts and schedule the one or more media posts using the smart speaker application. The smart speaker application may send the one or more media posts to the skill or application as a briefing at a particular time including immediately or in realtime.

At the particular time, smart speaker devices having the skill or application may provide a notification indicating that the briefing is available for consumption. When the briefing is viewed or consumed by a user of the smart speaker device, the smart speaker skill or application may obtain information and track the consumption of the briefing.

This tracking information may be obtained by the smart speaker scheduler application and may be used to determine other related skills or applications that may be related to the user of the smart speaker device. The user of the smart speaker device may be interested in these other related skills or applications. As a result, the smart speaker scheduler application may select media posts associated with the other related skills or applications and may send these media posts to the smart speaker device and provide a notification indicating that a briefing associated with these other skills or applications are available for consumption. In one example, an audience may be determined that may include a portion of the smart speaker devices in the smart speaker media network. The smart speaker scheduler application may broadcast one or more briefings to the audience in an order that may be determined by the smart speaker scheduler application such as a first briefing associated with a first skill or application followed by a second briefing associated with a second skill or application followed by a third briefing associated with the first skill or application, and so on.

According to an aspect, a system includes a memory and at least one processor to execute computer-executable instructions to receive smart speaker skill/application generation information from a client computing device and generate a first smart speaker skill or application using the smart speaker skill/application generation information, receive at least one scheduled post from the client computing device to schedule at least one briefing at a scheduled time to be broadcast to a first plurality of smart speaker devices having the first smart speaker skill or application, broadcast the at least one briefing associated with the first smart speaker skill or application to the first plurality of smart speaker devices at the scheduled time, receive tracking and analytics information from each smart speaker in the first plurality of smart speaker devices having the first smart speaker skill or application, and determine an audience for the at least one briefing comprising the first plurality of smart speaker devices having the first smart speaker skill or application and a second plurality of smart speaker devices having a second smart speaker skill or application different from the first smart speaker skill or application based on the tracking and analytics information.

According to another aspect, a method includes receiving, by at least one processor, smart speaker skill/application generation information from a client computing device and generating a first smart speaker skill or application using the smart speaker skill/application generation information, receiving, by the at least one processor, at least one scheduled post from the client computing device to schedule at least one briefing at a scheduled time to be broadcast to a first plurality of smart speaker devices having the first smart speaker skill or application, broadcasting, by the at least one processor, the at least one briefing associated with the first smart speaker skill or application to the first plurality of smart speaker devices at the scheduled time, receiving, by the at least one processor, tracking and analytics information from each smart speaker in the first plurality of smart speaker devices having the first smart speaker skill or application, and determining, by the at least one processor, an audience for the at least one briefing comprising the first plurality of smart speaker devices having the first smart speaker skill or application and a second plurality of smart speaker devices having a second smart speaker skill or application different from the first smart speaker skill or application based on the tracking and analytics information.

According to an additional aspect, a non-transitory computer-readable storage medium includes instructions stored thereon that, when executed by a computing device cause the computing device to perform operations, the operations including receiving smart speaker skill/application generation information from a client computing device and generating a first smart speaker skill or application using the smart speaker skill/application generation information, receiving at least one scheduled post from the client computing device to schedule at least one briefing at a scheduled time to be broadcast to a first plurality of smart speaker devices having the first smart speaker skill or application, broadcasting the at least one briefing associated with the first smart speaker skill or application to the first plurality of smart speaker devices at the scheduled time, receiving tracking and analytics information from each smart speaker in the first plurality of smart speaker devices having the first smart speaker skill or application, and determining an audience for the at least one briefing comprising the first plurality of smart speaker devices having the first smart speaker skill or application and a second plurality of smart speaker devices having a second smart speaker skill or application different from the first smart speaker skill or application based on the tracking and analytics information.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 3 shows a block diagram of media content to be broadcast to a network of smart speaker devices according to an example embodiment.

FIG. 4A illustrates a flowchart for generating a smart speaker skill or application and scheduling media content to be broadcast to the smart speaker media network according to an example embodiment.

DETAILED DESCRIPTION

Figure 1:
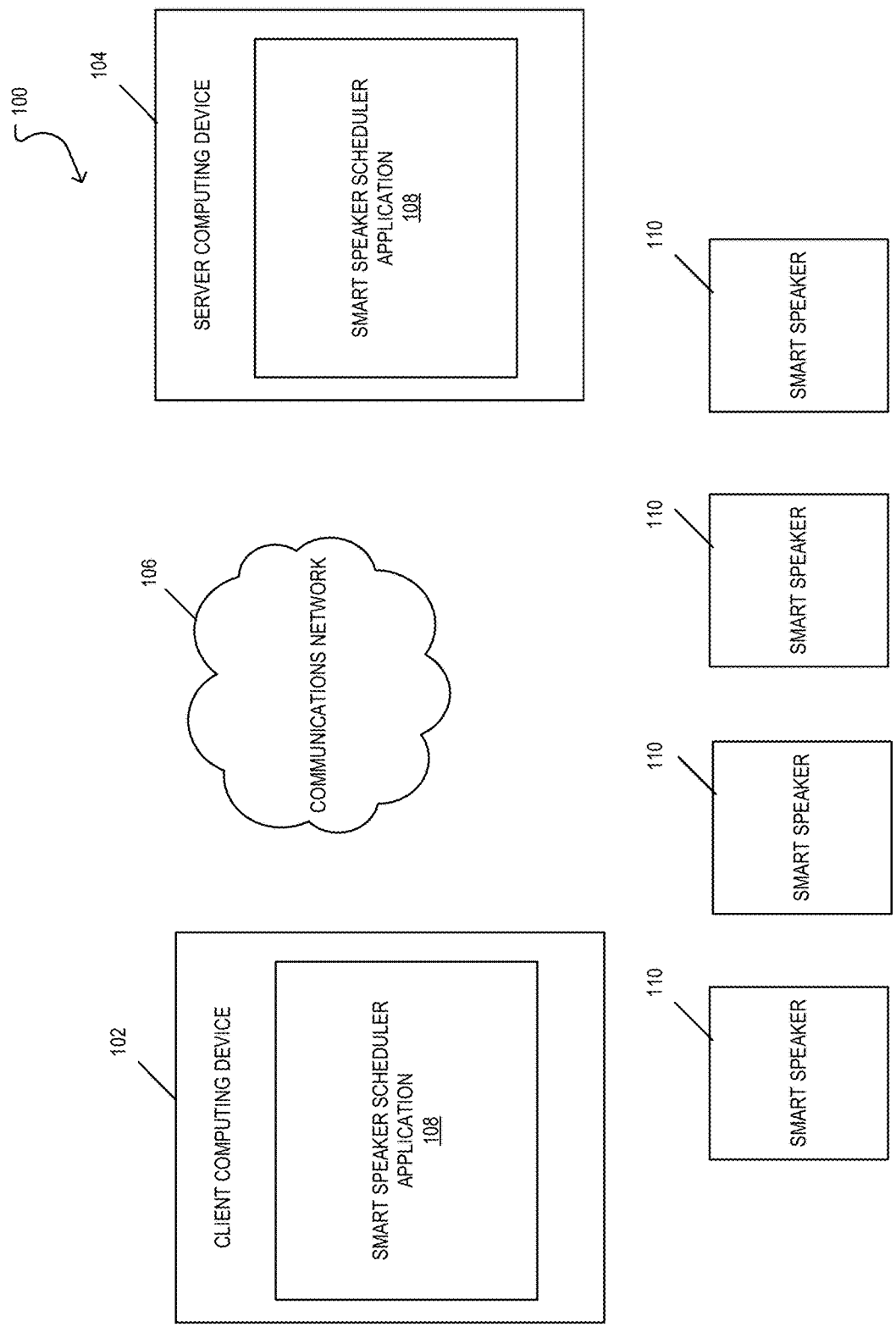
FIG. 1 is a block diagram of a system for generating a smart speaker skill or application and scheduling media content to be broadcast to a smart speaker media network according to an example embodiment.

Aspects of a system and method for generating a smart speaker skill or application and scheduling media content to be broadcast includes at least one server computing device having a smart speaker scheduler application, at least one client computing device, and a plurality of smart speaker devices, e.g., a smart speaker media network, that may receive scheduled and broadcasted content from one or more smart speaker skills or applications.

In one example, a user of the client computing device may create a smart speaker skill or application by sending information to the smart speaker scheduler application. The smart speaker scheduler application may receive the skill or application information from the user and automatically create the skill or application for the user. In one example, the smart speaker scheduler application may use an application programming interface (API) to communicate with another server computing device and generate the skill or application for the user.

Next, the user may create one or more media posts and schedule the one or more media posts using the smart speaker application. The smart speaker application may transmit, broadcast, or send the one or more media posts to the skill or application as a briefing at a particular time including immediately or in realtime.

At the particular time, smart speaker devices having the skill or application may provide a notification indicating that the briefing is available for consumption. When the briefing is viewed or consumed by a user of the smart speaker device, the smart speaker skill or application may obtain information and track the consumption of the briefing.

This tracking information may be obtained by the smart speaker scheduler application and may be used to determine other related skills or applications that may be related to the user of the smart speaker device. The user of the smart speaker device may be interested in these other related skills or applications. As a result, the smart speaker scheduler application may select media posts associated with the other related skills or applications and may send these media posts to the smart speaker device and provide a notification indicating that a briefing associated with these other skills or applications are available for consumption.

In one example, an audience may be determined that may include a portion of the smart speaker devices in the smart speaker media network. The smart speaker scheduler application may transmit, broadcast, or send one or more briefings to the audience in an order that may be determined by the smart speaker scheduler application such as a first briefing associated with a first skill or application followed by a second briefing associated with a second skill or application followed by a third briefing associated with the first skill or application, and so on.

Social media platforms, websites, and networks provide a way for businesses and individuals to promote products and services. In many cases, the businesses and individuals may use the social media networks at very low cost, often free. As an example, a business may have a team of marketers that are tasked with social media marketing. However, in other cases, a small business may include a very small number of employees or workers, e.g., one worker, that develops and sells a product or service and is also tasked with marketing the product or service. It may be difficult for the small business to compete with a large team of marketers that are tasked with social media marketing.

In many cases, it may be desirable to publish similar messages and social media posts on multiple social media networks simultaneously and/or contemporaneously. The small business may wish to publish one or more social media posts that are related to a same or similar topic or subject over a particular period of time and the small business may wish to reuse the one or more social media posts to create a marketing campaign to blast out similar or related content over a period of time. In one example, it may be desirable to create one or more posts to the smart speaker media network and smart speaker devices associated with the smart speaker media network in conjunction with social media posts on social media networks.

Platforms and networks may authorize another application and/or server computing device to access the social media platforms and networks on their behalf. As an example, the application and/or server computing device may have access using OAuth. OAuth is a protocol for authorization and allows a third-party application to obtain limited access to a Hypertext Transfer Protocol (HTTP) service on behalf of a resource owner by allowing an approval interaction between the resource owner and the HTTP service or by allowing the third-party application to have access on its own. As an example, OAuth allows a user to grant a third-party website or web service access to another website or web service without providing a password. As an example, the user may provide their username or handle and OAuth may grant access. As a result, AMAZON as well as social media platforms may permit a user to share information about their account with a third party application or website. The system for scheduling media content to be broadcast may use OAuth or another protocol for authorization to allow access to one or more platforms and/or accounts.

In one example, the system may include a memory and at least one processor to receive smart speaker skill/application generation information from a client computing device and generate a first smart speaker skill or application using the smart speaker skill/application generation information, receive at least one scheduled post from the client computing device to schedule at least one briefing at a scheduled time to be broadcast to a first plurality of smart speaker devices having the first smart speaker skill or application, broadcast the at least one briefing associated with the first smart speaker skill or application to the first plurality of smart speaker devices at the scheduled time, receive tracking and analytics information from each smart speaker in the first plurality of smart speaker devices having the first smart speaker skill or application, and determine an audience for the at least one briefing comprising the first plurality of smart speaker devices having the first smart speaker skill or application and a second plurality of smart speaker devices having a second smart speaker skill or application different from the first smart speaker skill or application based on the tracking and analytics information.

FIG. 1 shows a block diagram of a computing system comprising a smart speaker media network system 100 according to an example embodiment. The smart speaker media network system 100 includes at least one client computing device 102 that is in communication with at least one server computing device 104 via a communication network 106. The at least one server computing device 104 may have an application or at least one component of an application, e.g., a smart speaker scheduler application 108. In addition, the smart speaker media network system 100 may include a plurality of smart speaker devices 110 that may be in communication with the at least one server computing device 104 via the communication network 106.

The at least one client computing device 102 is configured to receive data from and/or transmit data to the at least one server computing device 104 through the communication network 106. Although the at least one client computing device 102 is shown as a single computing device, it is contemplated that the at least one client computing device 102 may include multiple computing devices.

The communication network 106 can be the Internet, an intranet, or another wired or wireless communication network. For example, the communication network 106 may include a Mobile Communications (GSM) network, a code division multiple access (CDMA) network, $3^{rd}$ Generation Partnership Project (GPP) network, an Internet Protocol (IP) network, a wireless application protocol (WAP) network, a WiFi network, a Bluetooth network, a satellite communications network, or an IEEE 802.11 standards network, as well as various communications thereof. Other conventional and/or later developed wired and wireless networks may also be used.

The at least one client computing device 102 includes at least one processor to process data and memory to store data. The processor processes communications, builds communications, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions such as a portion or component of the smart speaker scheduler application 108. In addition, the at least one client computing device 102 further includes at least one communications interface to transmit and receive communications, messages, and/or signals.

The at least one server computing device 104 includes at least one processor to process data and memory to store data. The processor processes communications, builds communications, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions such as a portion or a component of the smart speaker scheduler application 108. In addition, the at least one server computing device 104 further includes at least one communications interface to transmit and receive communications, messages, and/or signals.

The at least one client computing device 102 can be a laptop computer, a smartphone, a personal digital assistant, a tablet computer, a standard personal computer, or another processing device. The at least one client computing device 102 may include a display, such as a computer monitor, for displaying data and/or graphical user interfaces. The at least one client computing device 102 may also include a Global Positioning System (GPS) hardware device for determining a particular location of the client computing device 102, an input device, such as a camera, a keyboard or a pointing device (e.g., a mouse, trackball, pen, or touch screen) to enter data into or interact with graphical and/or other types of user interfaces. In an exemplary embodiment, the display and the input device may be incorporated together as a touch screen of the smartphone or tablet computer.

The at least one client computing device 102 may display on the display a graphical user interface (or GUI). The graphical user interface may be provided by the smart speaker scheduler application 108. The graphical user interface enables a user of the at least one client computing device 102 to interact with the smart speaker scheduler application 108 and create and generate a smart speaker skill or application. In addition, the user is able to create and schedule one or more media posts or briefings that may be scheduled to be transmitted, sent, or broadcast to users who have installed the smart speaker skill or application on a smart speaker device. The media post or briefing may be based on text and content that may include one or more words, one or more hashtags, one or more emojis, one or more quotations, and one or more images, among other content. The text may include one or more uniform resource locators (URLs). The media post or briefing also may be generated based on one or more audio or video files that the user may select and upload using the smart speaker scheduler application 108.

The smart speaker scheduler application 108 may be a component of an application and/or service executable by the at least one server computing device 104. For example, the smart speaker scheduler application 108 may be a single unit of deployable executable code or a plurality of units of deployable executable code. According to one aspect, the smart speaker scheduler application 108 may include one component that may be a web application, a native application, and/or a mobile application (e.g., an app) downloaded from a digital distribution application platform that allows users to browse and download applications developed with mobile software development kits (SDKs) including the App Store and GOOGLE PLAY®, among others.

The smart speaker device 110 may include at least one processor to process data and memory to store data. The processor processes communications, builds communications, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions such as a portion or component of the smart speaker scheduler application 108. In addition, the smart speaker device 110 further includes at least one communications interface to transmit and receive communications, messages, and/or signals. In one example, the smart speaker device 110 may be from the family of AMAZON ALEXA computing devices, from the family of GOOGLE HOME computing devices, from the family of APPLE HOMEPOD computing devices, or another device. The smart speaker device 110 may have one or more speakers, one or more microphones, one or more cameras or imaging devices, and/or one or more display devices for displaying output and/or a graphical user interface (GUI). The display device may be a touch screen device. The display device also may be or include one or more lights or light-emitting diodes (LEDs).

The smart speaker device 110 may display on the display a graphical user interface (or GUI). The graphical user interface may be provided by the smart speaker scheduler application 108. The graphical user interface enables a user of smart speaker device 110 to interact with the smart speaker scheduler application 108 such as view and interact with one or more briefings.

The smart speaker media network system 100 may also include a relational database management system (RDBMS) or another type of database management system such as a NoSQL database system that stores and communicates data from at least one database. The data stored in the at least one database may be associated with a library of media posts or briefings to be broadcast to the smart speakers associated with the smart speaker media network 100. The library of media posts may include one or more of a plurality of draft media posts, a number of media posts that have been broadcast, and a number of media posts that have been scheduled to broadcast. In addition, the data stored in the at least one database may include information associated with the media posts including statistical and analytical information associated with the media posts. As an example, the database may include one or more tables or data structures that may be organized to store the information associated with the database.

Figure 2:
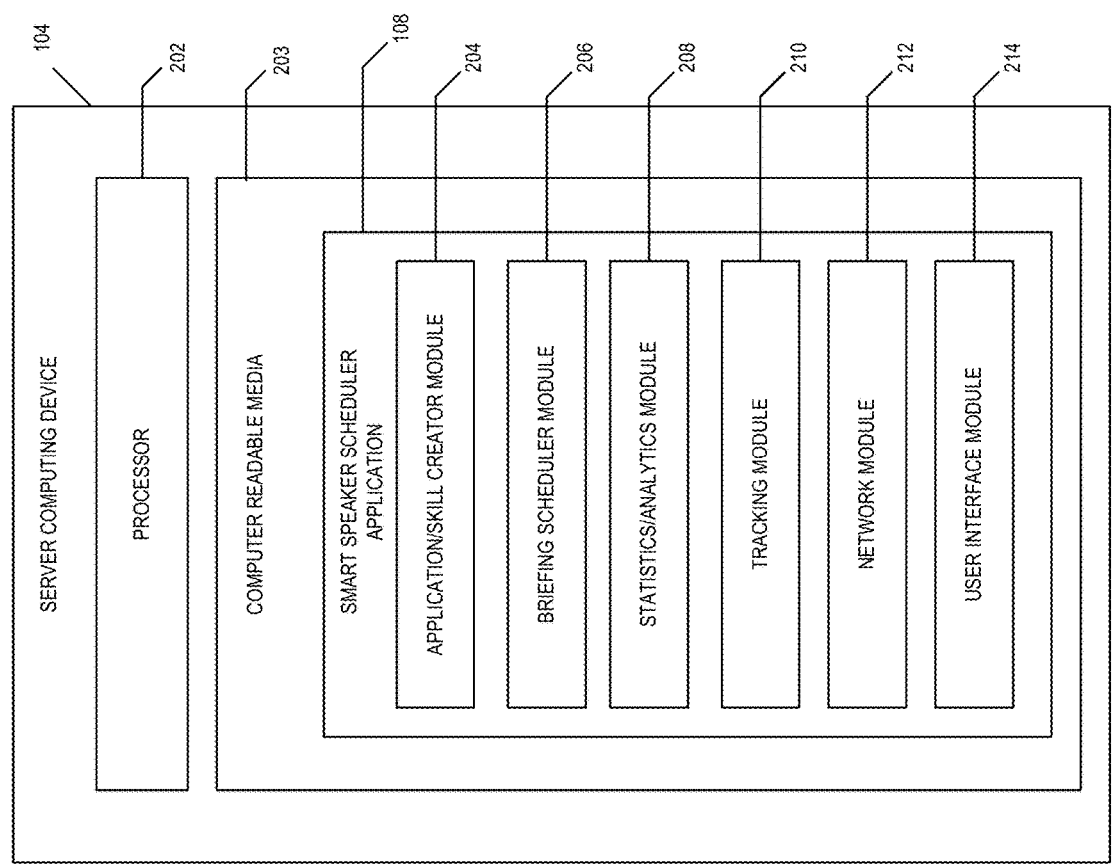
FIG. 2 shows a block diagram of a server computing device of the system having a smart speaker scheduler application according to an example embodiment.

FIG. 2 illustrates a block diagram of the server computing device 104 according to an example embodiment. The server computing device 104 includes at least one processor 202 and computer readable media (CRM) 203 in memory on which the smart speaker scheduler application 108 or other user interface or application is stored. The computer readable media 203 may include volatile media, nonvolatile media, removable media, non-removable media, and/or another available medium that can be accessed by the processor. By way of example and not limitation, the computer readable media comprises computer storage media and communication media. Computer storage media includes non-transitory storage memory, volatile media, nonvolatile media, removable media, and/or non-removable media implemented in a method or technology for storage of information, such as computer/machine-readable/executable instructions, data structures, program modules, or other data. Communication media may embody computer/machine-readable/executable instructions, data structures, program modules, or other data and include an information delivery media or system, both of which are hardware.

The smart speaker scheduler application 108 may include an application/skill creator module 204 that allows a user to create and generate an application/skill that may be launched on the smart speaker media network 100 and installed on the smart speakers 110 associated with the smart speaker media network. The application/skill creator module 204 may be associated with the Alexa Skills Kit (ASK) that is a software development framework that enables a user to create content such as skills or apps for the smart speaker device 110. As an example, a user may provide account information such as a username and password that allows the user to create and generate one or more applications or skills. In one example, the account information may be AMAZON or ALEXA account information.

The skill or application that is created using the application/skill creator module 204 may be triggered by a smart speaker when one or more microphones receive or hear a specific word. The user may then speak to the smart speaker device 110 to obtain information provided by the skill or app. The smart speaker device 110 may handle speech recognition and natural language processing and provide information associated with the app or skill to a user.

In another example, the application/skill creator module 204 may be associated with another application programming interface (API) or software development framework other than ASK.

In order to create and generate an application or skill, the user may provide a name for the skill or app, a description that may be text-based for the skill or app, a background image for the skill or app, a skill or app logo, and an icon for the skill or app. The user may provide this information using a graphical user interface (GUI) provided by the smart speaker scheduler application 108 and may select a user interface element such as "Create a Skill" button that when selected may create and generate the skill or application for the user using the ASK and/or another API.

The smart speaker scheduler application 108 may include a briefing scheduler module 206 that allows the user to provide and schedule one or more briefings to be broadcast to users associated with the smart speaker media system 100 and a network of smart speakers 110 that may have the skill or application that was generated by the application/skill creator module 204. As an example, the user may create a new post that may include text entered by a user, one or more URLs, one or more hashtags, one or more emojis, and one or more audio or video files. The user may save the briefing as a draft or may post the briefing to be scheduled to be transmitted, sent, or broadcast at a particular time or be transmitted, sent, or broadcast now, e.g., in real time. In one example, the briefing scheduler module 206 may send a representation of the post to another server computing device using the ASK and/or another API to convert the representation of the post into a format for presentation by the smart speaker media network. As an example, the text, text found at the one or more URLs, the one or more hashtags, the one or more emojis, and the one or more audio or video files may be converted into audio and/or video by the briefing scheduler module 206 to be played by the smart speaker devices 110 associated with the smart speaker media network. As an example, the briefing scheduler module 206 may parse the data associated with the post to convert text, text found at the URLs, hashtags, or the emojis into audio and/or video to be played by the smart speaker devices 110.

The briefing scheduler module 206 may use a Flash Briefing Skill API or another API to send information associated with the post to the network of smart speaker devices 110. A user of the smart speaker device 110 may later obtain the briefing by providing a voice command such as "ALEXA, play my super cool briefing."

When the briefing is scheduled to be broadcast at the particular time or now, the briefing scheduler 206 may send the briefing to be broadcast to a network of smart speaker devices 110 that may have the skill or app that was generated using the application/skill creator module 204. In another example, the briefing may be broadcast in realtime to the network of smart speaker devices 110 that may have the skill or app that was generated using the application/skill creator module 204.

As an example, the briefing may be sent to each of the smart speaker devices 110 and each smart speaker device 110 may provide a notification that indicates that the briefing is available for playback by a user at a current time or at a future time. In one example, the smart speaker device 110 may indicate the notification by blinking a light, providing a sound, displaying a push notification on a display of the smart speaker device 110, or providing another type of notification such as by providing an indication on a graphical user interface associated with the smart speaker device 110.

The briefing scheduler module 206 may allow the user to view the scheduled draft briefings by month, by week, by day, in a timeline, or in a list. In addition, each scheduled draft briefing may be shown on a calendar in a particular color that indicates an associated smart speaker media network, platform, and/or account. As an example, a scheduled draft briefing may be scheduled to be broadcast on the smart speaker media network at 8:30 P.M. on Wednesday. At that time, the draft briefing is broadcast to the smart speaker media network. In addition, the user may schedule the draft briefing to publish on more than one smart speaker media network at 8:30 P.M. in a user's time zone or a particular time zone such as a first smart speaker media network time zone or a second smart speaker media network time zone different from the first smart speaker media network time zone. Alternatively, the briefing scheduler module 206 may allow the user to broadcast the briefing in realtime to the smart speaker media network.

The smart speaker scheduler application 108 also may be associated a library of social media posts that may be scheduled to be posted. The smart speaker scheduler application 108 may be associated with a number of social media usernames and passwords provided to the server computing device 104 for a number of social media platforms and accounts including, but not limited to, FACEBOOK, TWITTER, SNAPCHAT, LINKEDIN, TIKTOK, PINTEREST, REDDIT, SHOPIFY, WORDPRESS, TUMBLR, BLOGGER, YOUTUBE, TWITCH, DRIBBBLE, TELEGRAM, WHATSAPP, SLACK, MESSENGER, GOOGLE, and INSTAGRAM. The one or more briefings may be scheduled to be posted to coincide, in conjunction with, or simultaneous with the social media posts.

The smart speaker scheduler application 108 may include a statistics/analytics module 208 that collects information associated with the network of smart speaker devices 110 that have the skill or app that was generated using the application/skill creator module 204. As an example, the statistics/analytics module 208 may determine how many users in the network of smart speaker devices 110 have interacted with the one or more briefings, geographic information associated with the users in the network of smart speaker devices 110 such as countries that have interacted with the one or more briefings, revenue information associated with the one or more briefings, and time of engagement information such as a most popular time of the day that users have interacted with the one or more briefings, e.g., 14:00. In addition, the statistics/analytics module 208 may provide information such as a number of followers of the skill or app that was generated using the application/skill creator module 204, a number of total clicks or interactions with the one or more briefings, a map of the world that indicates information associated with engagement with the one or more briefings (e.g., a thumbnail having a pin on the map of the country where the briefing was most popular), graphical information that is associated with demographics of users that have engaged with the one or more briefings, session information associated with the one or more briefings (e.g., a graph showing a number of hours per day for a particular demographic), gender statistics information associated with the users that have engaged with the one or more briefings (e.g., 75% male and 25% female), age information for the users that have engaged with the one or more briefings (e.g., a percentage of the users divided by age groupings and gender information for each age grouping), revenue information for the one or more briefings, and other information.

The statistics/analytics module 208 may provide a dashboard for the user that created the skill or app generated using the application/skill creator module 204. The user may use the dashboard to obtain the statistics/analytics information, view messages associated with the application or skill, view a schedule for the one or more briefings to be broadcast, view a media library of audio/video and other content that may be broadcast using the one or more briefings, and settings information associated with the skill or app generated using the application/skill creator module 204.

The smart speaker scheduler application 108 may include a tracking module 210 that may track each user in the network of smart speaker devices 110 that engages with the one or more briefings provided by the skill or app that is generated using the application/skill creator module 204. As an example, each user and/or each smart speaker device may be tracked using a unique identifier that identifies the user anonymously. The user may be tracked using one or more APIs to determine a particular audience that interacts with the skill or app that is generated using the application/skill creator module 204. The tracking module 210 may determine information such as conversion rate for each user, drop off rate, interaction rate or click through rate, and other information for each user and smart speaker device 110.

As an example, the tracking module 210 may provide a piece of code or a tracking pixel placed in each of the one or more briefings that allows the tracking module 210 to collect data and determine who has viewed or consumed the briefing, determine what actions the users may have taken associated with the one or more briefings, and build a targeted audience for the application or skill.

The smart speaker scheduler application 108 may include a network module 212 that may be used to determine skills or apps and/or other content that may be of interest for each audience associated with the smart speaker media network system 100. As an example, a first audience that uses a first skill or app generated using the application/skill creator module 204 may be tracked using the tracking module 210 and it may be determined that the audience may be interested in a second skill or app generated using the application/skill creator module 204. In one example, the network module 212 may be used to determine one or more briefings associated with the second skill or app that may be of interest to the audience associated with the first skill or app. The network module 212 may be used to insert the one or more briefings associated with the second skill or app within briefings provided by and scheduled by the first skill or app so that the audience associated with the first skill or app receives both the one or more briefings associated with the first skill or app and the second skill or app when they are interacting with the first skill or app.

Alternatively, it may be determined that the audience that uses the second skill or app may be interested in a third skill or app generated using the application/skill creator module 204. As an example, the network module 212 may be used to determine one or more briefings associated with the third skill or app that may be of interest to the audience associated with the second skill or app. The network module 212 may be used to insert or interleave the one or more briefings associated with the third skill or app before or after briefings provided by and scheduled by the second skill or app so that the audience associated with the second skill or app receives both the one or more briefings associated with the second skill or app and the third skill or app when they are interacting with the second skill or app. As an example, the network module 212 may insert a five to ten second briefing associated with the third skill or app before or after a briefing associated with the second skill or app.

The network module 212 may determine that an audience may be interested in briefings from another skill or app based on interaction information and tracking information obtained by the tracking module 210 as well as information associated with a user of the smart speaker device such as an age, a gender, geographic information, interests of the user, information provided to the smart speaker device such as voice information and requests obtained by the smart speaker device 110 and other information.

In addition, the smart speaker scheduler application includes a user interface module 214 for displaying the user interface on the display of the client computing device 102 and/or the smart speaker device 110. As an example, the user interface module 214 generates a native and/or web-based graphical user interface (GUI) that accepts input and provides output viewed by a user of the client computing device 102 or the smart speaker device 110. The client computing device 102 or the smart speaker device 110 may provide realtime automatically and dynamically refreshed information such as a draft briefing and information provided by the statistics/analytics module 208, among other information. The user interface module 214 may send data to other modules of the smart speaker scheduler application 108 of the server computing device 104, and retrieve data from other modules of the smart speaker scheduler application 108 of the server computing device 104 asynchronously without interfering with the display and behavior of the user interface displayed by the client computing device 102 or the smart speaker device 110.

FIG. 3 shows a block diagram of media content to be broadcast by a network of smart speaker devices according to an example embodiment. As shown in FIG. 3, a user may schedule one or more briefings 302 including briefing one, briefing two, and briefing three to be broadcast by the network of smart speaker devices 110 using the smart speaker scheduler application 108. The one or more briefings 302 may be scheduled to be broadcast using the skill or app that is created using the application/skill creator module 204. In addition, as shown in FIG. 3, the tracking module 210 and the network module may be used to track the users that interact with the one or more briefings 302 provided by the skill or app and select one or more advertisements or other briefings provided by one or more different skills or apps that may be generated by the application/skill creator module 204. As an example, a first advertisement 304 may be inserted to be scheduled to be played or broadcast after the briefing one and before the briefing two and a second advertisement 304 may inserted to be scheduled to be played or broadcast after the briefing two and before the briefing three.

In one example, the one or more briefings 302 may be associated with a first skill or app and the first advertisement 304 may be associated with a second skill or app and the second advertisement 304 may be associated with a third skill or app. Alternatively, the first advertisement 304 and/or the second advertisement 304 may not be associated with a skill or app.

FIG. 4A illustrates a flowchart of a process 400 for creating and generating a smart speaker skill or application and scheduling one or more media posts or briefings according to an example embodiment. In step 410, the server computing device 104 receives smart speaker skill or application generation information from the client computing device 102. The server computing device 102 may submit the information using the ASK or another API to generate the skill or application.

In step 420, the server computing device 104 may receive at least one scheduled post to schedule at least one briefing using the skill or app to transmit, send, or broadcast the at least one briefing to a plurality of smart speaker devices 110, e.g., a smart speaker media network.

In step 430, the server computing device 104 may transmit, send, or broadcast the at least one briefing to the plurality of smart speaker devices 110, e.g., the smart speaker media network. In one example, the server computing device 104 may transmit, send, or broadcast the at least one briefing by sending the briefing to another server that forwards or sends the briefing on behalf of the server computing device 104. Each of smart speaker devices 110 may provide a notification that indicates that the briefing is ready for consumption, e.g., listening or viewing. In one example, the smart speaker device 110 may illuminate a light, play a sound, and/or provide another type of notification.

In step 440, the server computing device 104 may receive tracking and analytics information from each of the plurality of smart speaker devices 110 or at least some of the plurality of smart speaker devices 110. As an example, each smart speaker device or each user that consumes the content associated with the briefing may be represented using a unique identifier that allows the skill or app to determine an audience that consumed or interacted with the at least one briefing provided by the skill or app. This may allow the server computing device 104 to determine another potential audience that may be interested in the skill or app.

In step 450, the server computing device 104 may determine at least one related skill or app, e.g., a second skill or app, and select at least one briefing associated with the related skill or app. The server computing device 104 may schedule the at least one briefing associated with the second skill or app to be played before or after a briefing provided by the first skill or app. The server computing device 104 may determine the second skill or app using the tracking and analytics information from each of the plurality of smart speaker devices 110.

As an example, the smart speaker scheduler application 108 may send a graphical user interface (GUI) to the client computing device 102 and display the GUI on a display of the client computing device 102 and/or the smart speaker device 110. The GUI may show the draft post, among other information. The client computing device 102 may display text associated with the draft post in a text box user interface element, display the list of hashtags in a hashtag user interface element, display a quotation in a quotation user interface element, and display a list of emojis in an emoji user interface element. In addition, the GUI may have a number that indicates a number of possible remaining characters for the post. The GUI also may have an add video and/or audio user interface element that allows the user to add one or more video or audio files to the post. The smart speaker scheduler application 108 may receive a selection of Post element on the GUI and schedule the post to be broadcast immediately and/or in realtime or schedule the post to be broadcast at a particular time.

Figure 4B:
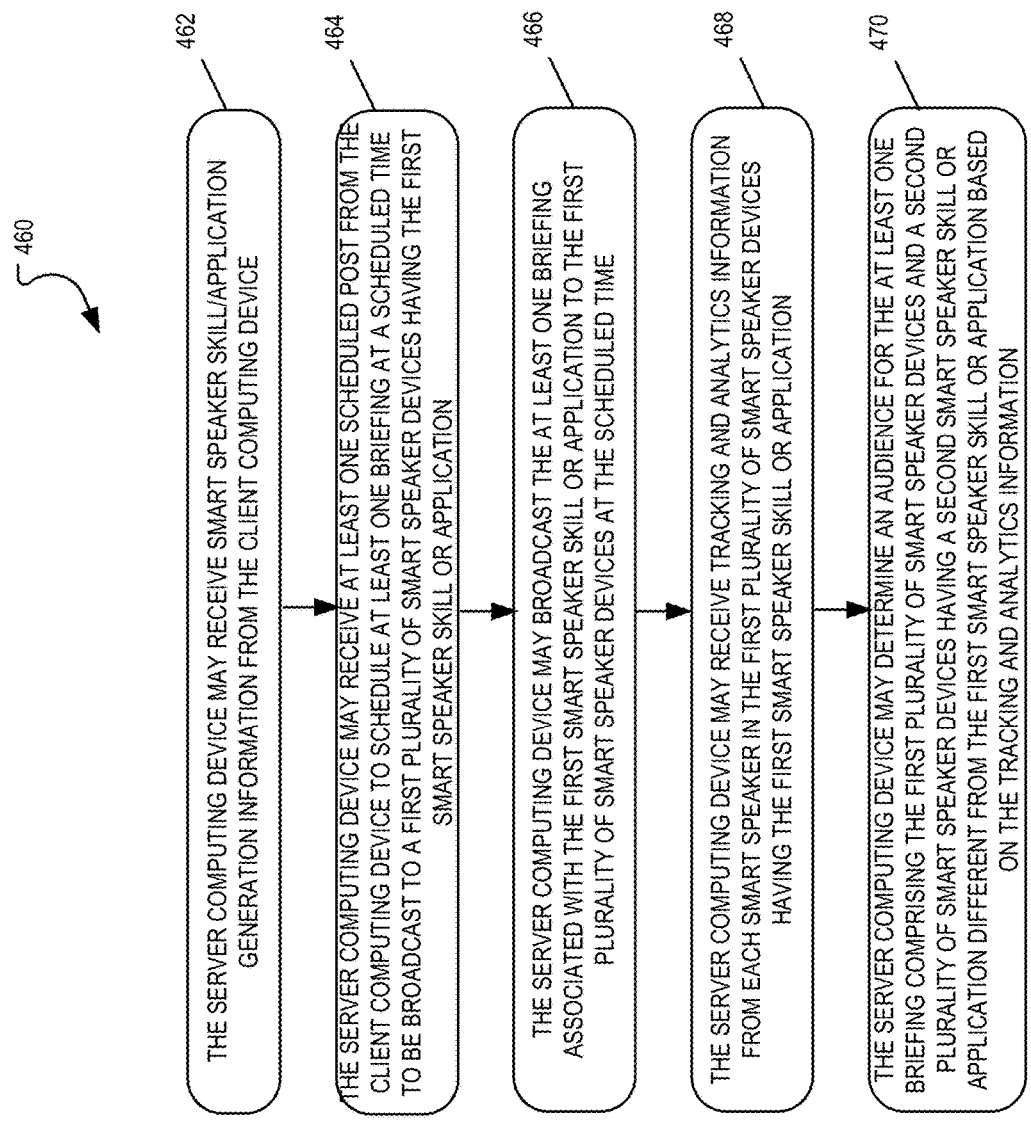
FIG. 4B illustrates another flowchart for creating and generating a smart speaker skill or application and scheduling one or more media posts or briefings to be broadcast to the smart speaker media network according to an example embodiment.

FIG. 4B illustrates another flowchart of a process 460 for creating and generating a smart speaker skill or application and scheduling one or more media posts or briefings according to an example embodiment.

In step 462, the server computing device 104 may receive smart speaker skill/application generation information from the client computing device 102 and generate a first smart speaker skill or application using the smart speaker skill/application generation information.

Next, in step 464, the server computing device 104 may receive at least one scheduled post from the client computing device 102 to schedule at least one briefing at a scheduled time to be broadcast or transmit to a first plurality of smart speaker devices having the first smart speaker skill or application.

Next, in step 466, the server computing device 104 may broadcast or transmit the at least one briefing associated with the first smart speaker skill or application to the first plurality of smart speaker devices at the scheduled time.

In step 468, the server computing device 104 may receive tracking and analytics information from each smart speaker 110 in the first plurality of smart speaker devices having the first smart speaker skill or application. The tracking and analytics information may be obtained when a user consumes, views, or interacts with the at least one briefing. Alternatively, the tracking and analytics information may be based on a lack of interaction or a disinterest in the at least one briefing.

Next, in step 470, the server computing device 104 may determine an audience for the at least one briefing comprising the first plurality of smart speaker devices having the first smart speaker skill or application and a second plurality of smart speaker devices having a second smart speaker skill or application different from the first smart speaker skill or application based on the tracking and analytics information.

In one example, the process 460 may include sending, broadcasting, or transmitting the at least one briefing associated with the first smart speaker skill or application to the second plurality of smart speaker devices having the second smart speaker skill or application.

In another example, the process 460 may include sending, broadcasting, or transmitting the at least one briefing associated with the first smart speaker skill or application to the second plurality of smart speaker devices having the second smart speaker skill or application after broadcasting the at least one briefing associated with the second smart speaker skill or application.

In another example, the process 460 may include sending, broadcasting, or transmitting the at least one briefing associated with the first smart speaker skill or application to the second plurality of smart speaker devices having the second smart speaker skill or application before broadcasting the at least one briefing associated with the second smart speaker skill or application.

In another example, the process 460 may include sending, broadcasting, or transmitting a first briefing of the at least one briefing associated with the second smart speaker skill or application to the second plurality smart speaker devices having the second smart speaker skill or application, broadcasting at least one briefing associated with the first smart speaker skill or application to the second plurality of smart speaker devices having the second smart speaker skill or application, and broadcasting a second briefing of the least one briefing associated with second smart speaker skill or application to the second plurality of smart speaker devices having the second smart speaker skill or application.

In another example, the process 460 may include sending, broadcasting, or transmitting the at least one briefing associated with the first smart speaker skill or application in realtime.

As an example, the process 460 may include determining at least one of a number of interactions with the at least one briefing associated with the first smart speaker skill or application, a top geographic region that interacted with the at least one briefing associated with the first smart speaker skill or application, and a most popular time of engagement for the at least one briefing associated with the first smart speaker skill or application.

Figure 5:
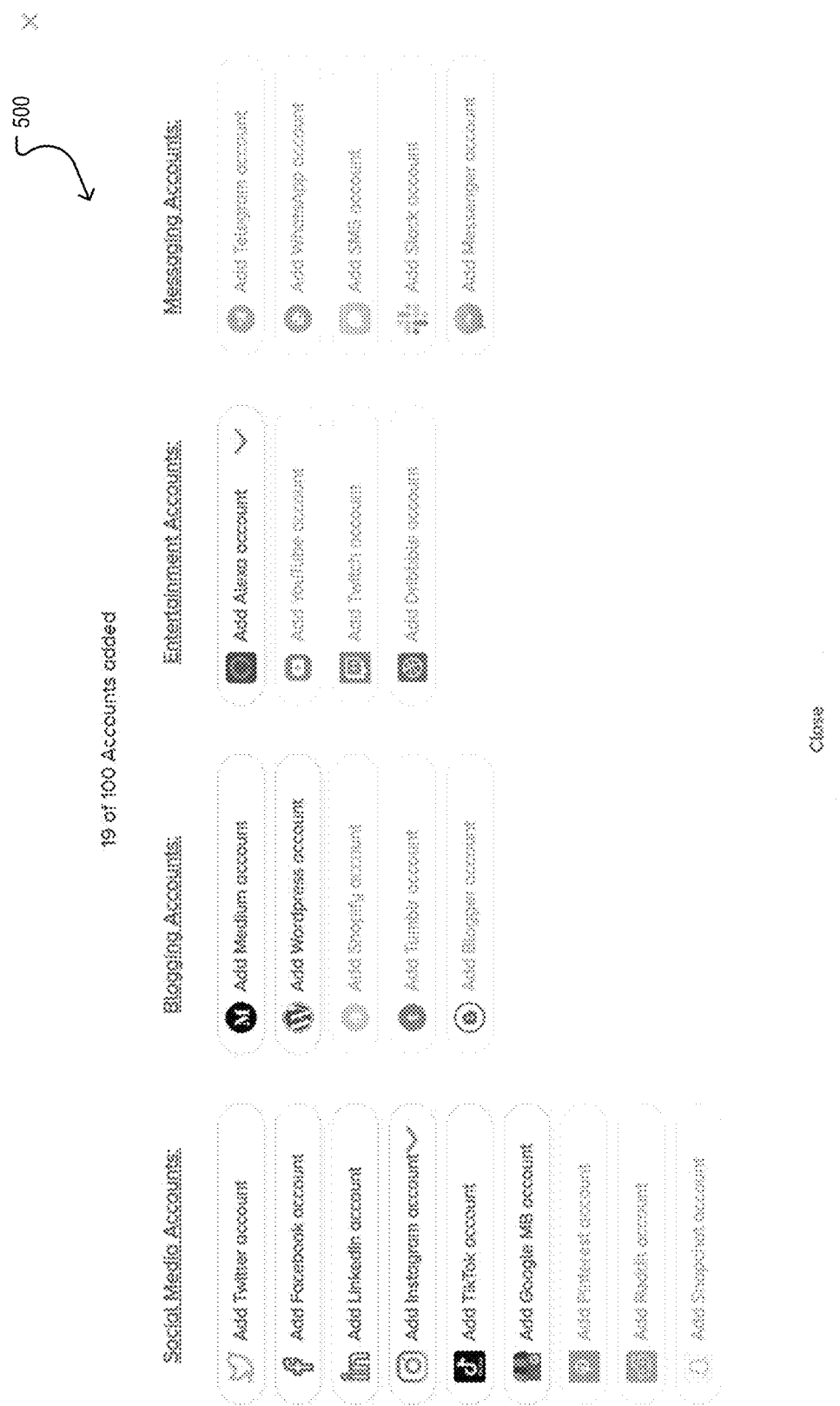
FIG. 5 illustrates an example user interface of an application displayed by a client computing device according to an example embodiment.

FIG. 5 shows an example user interface 500 of the smart speaker scheduler application 108 displayed by the client computing device 102 according to an example embodiment. As shown in FIG. 5, the user of the client computing device 102 may create and generate a skill or app using the smart speaker scheduler application 108 by adding account information to the smart speaker scheduler application 108. As shown in FIG. 5, the user may add ALEXA account information or account information associated with another platform that may provide or be associated with a smart speaker device 110.

Figure 6:
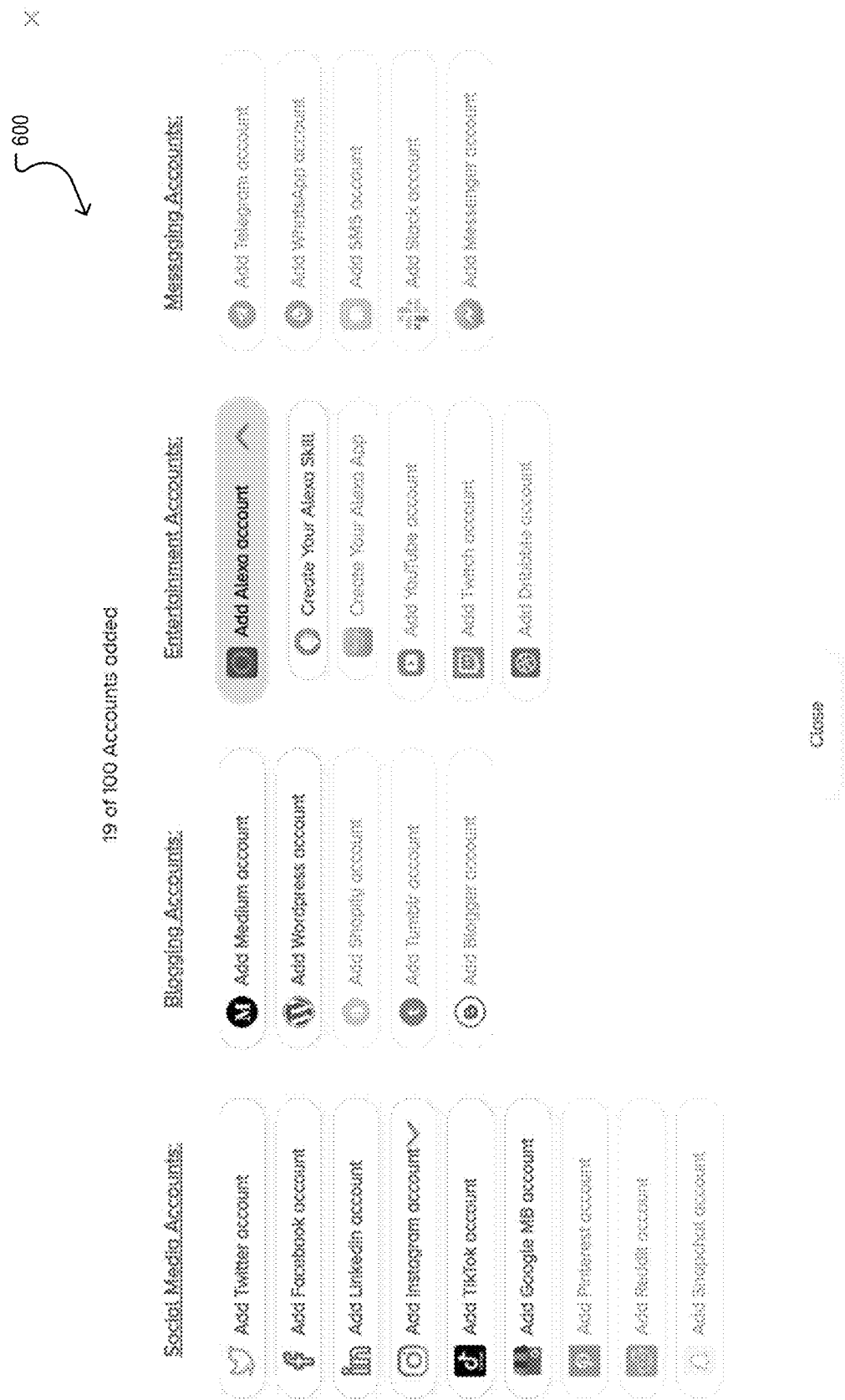
FIG. 6 illustrates an example user interface of the application displayed by the client computing device according to an example embodiment.

FIG. 6 shows an example user interface 600 of the smart speaker scheduler application 108 displayed by the client computing device 102 according to an example embodiment. As shown in FIG. 6, the user of the client computing device 102 may select either to generate a skill or generate an app using the smart speaker scheduler application 108. The user may either select a user interface element "Create Your Alexa Skill" or "Create Your Alexa App."

Figure 7:
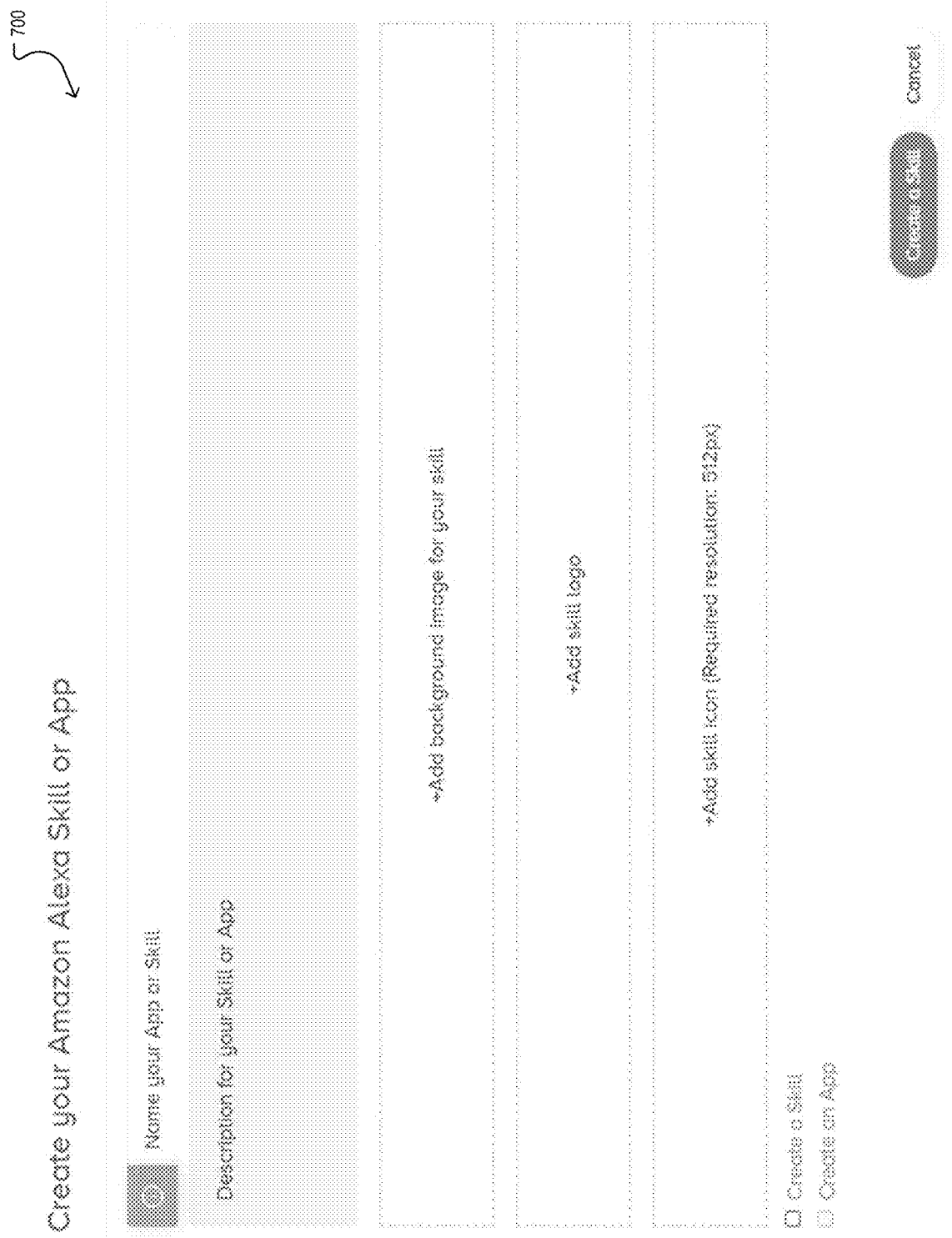
FIG. 7 illustrates an example user interface displayed by the client computing device according to an example embodiment.

FIG. 7 shows an example user interface 700 of the smart speaker scheduler application 108 displayed by the client computing device 102 according to an example embodiment. As shown in FIG. 7, the user of the client computing device 102 may provide a name for the app or skill, a description for the app or skill, a background image for the app or skill, a logo for the app or skill, and an icon for the app or skill. In addition, the user may select a user interface element that allows the user to create a skill or create an app and may select a button that when selected creates the app or the skill. As an example, the client computing device 102 may send the information to the server computing device 104 and the server computing device 102 may use the ASK to generate and create the skill or app.

Figure 8:
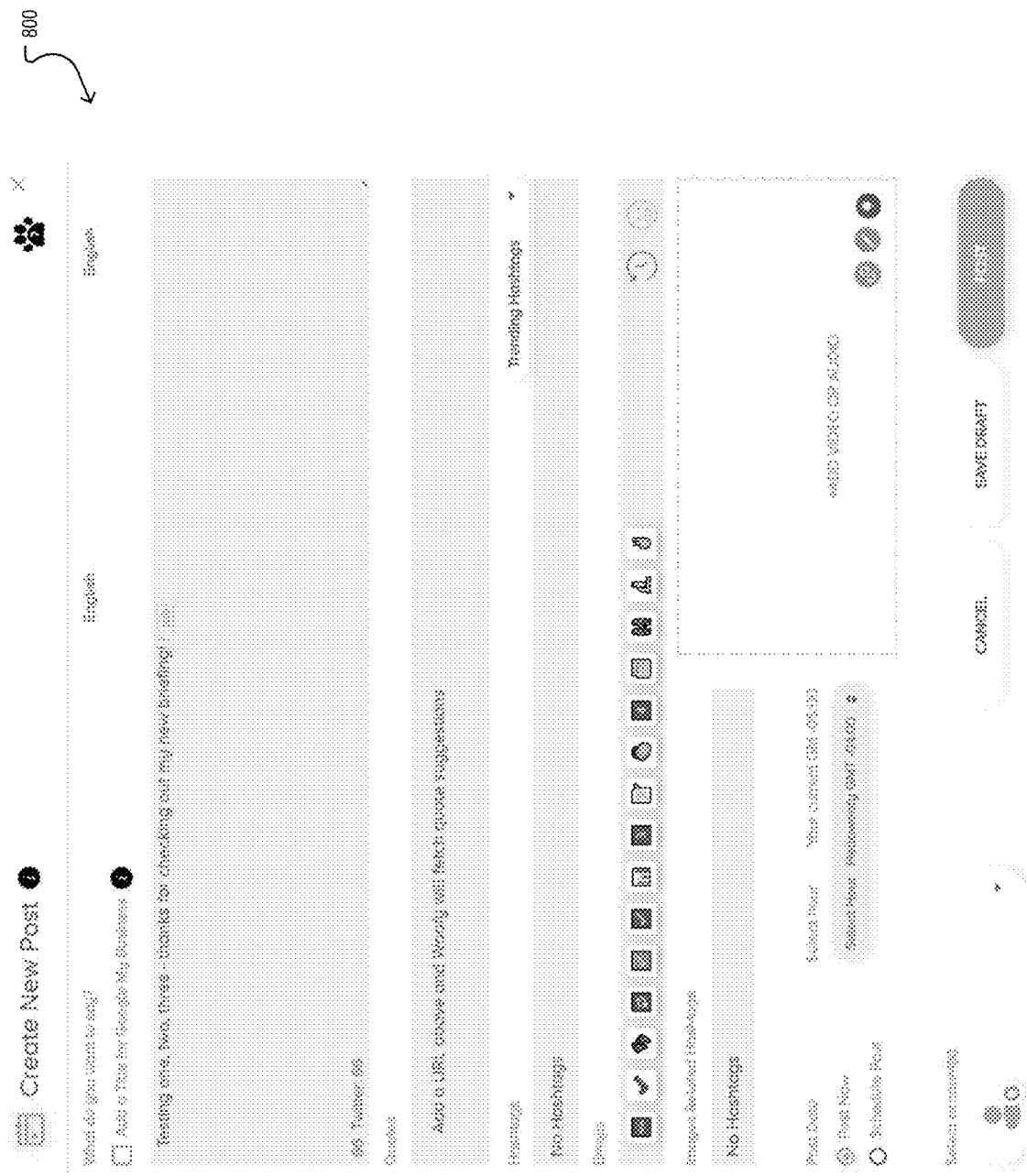
FIG. 8 illustrates an example user interface displayed by the client computing device according to an example embodiment.

FIG. 8 shows an example user interface 800 of the smart speaker scheduler application 108 displayed by the client computing device 102 according to an example embodiment. As shown in FIG. 8, the user of the client computing device may provide information for a new post, e.g., a briefing that may be scheduled and broadcast to the smart speaker media network of the smart speaker devices 110. The user may provide text information such as "Testing one, two, three—thanks for checking out my new briefing!" In addition, the user may provide one or more URLs, emojis, one or more hashtags, and one or more audio or video files to be scheduled to be broadcast in a briefing. The user may schedule the briefing to be posted immediately or at a later time. In addition, the user may save the briefing as a draft in a library of briefings to be stored in a database associated with the server computing device 104.

Figure 9:
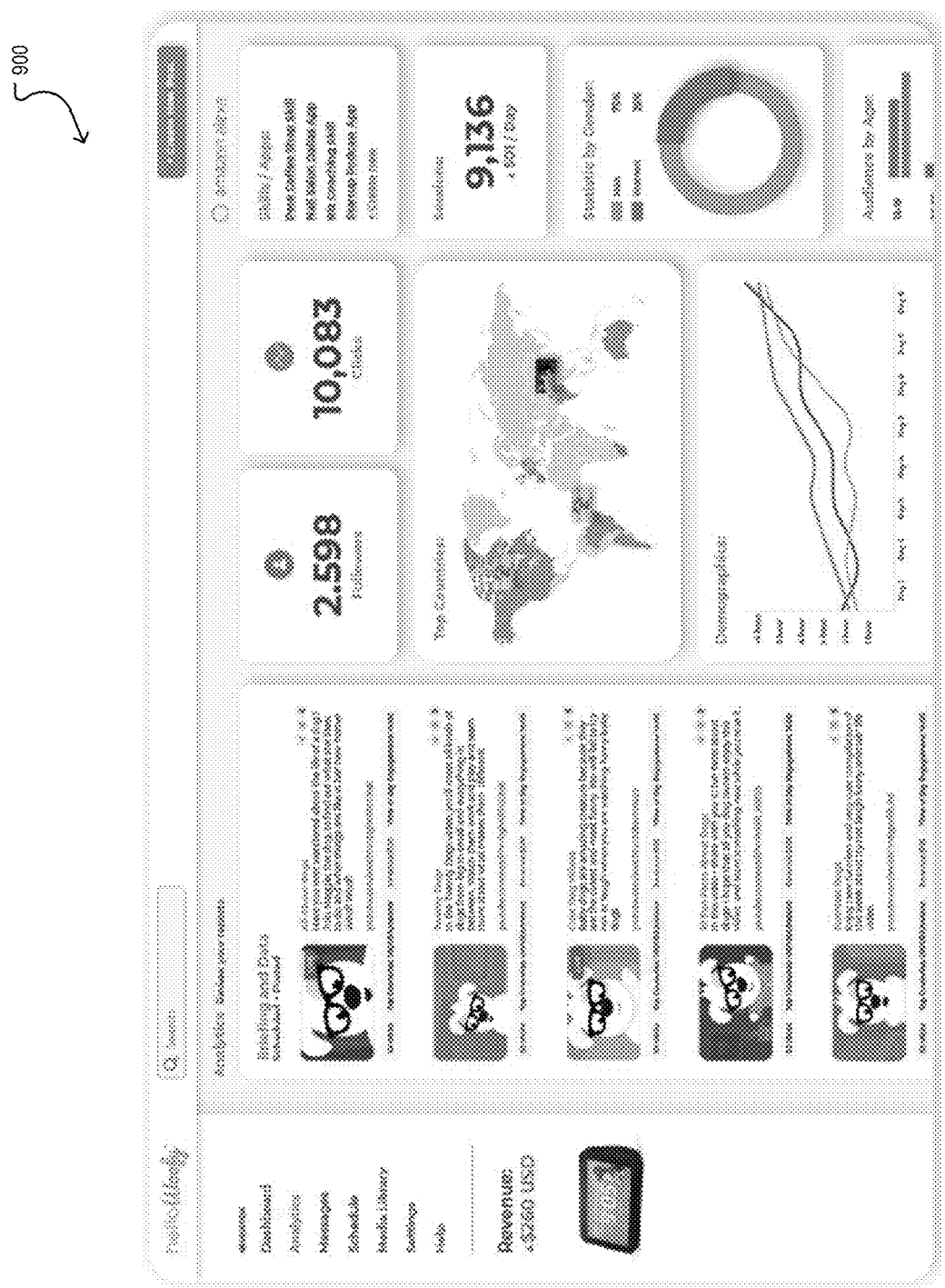
FIG. 9 illustrates an example user interface displayed by the client computing device according to an example embodiment.

FIG. 9 shows an example user interface 900 of the smart speaker scheduler application 108 displayed by the client computing device 102 according to an example embodiment. As shown in FIG. 9, the user of the client computing device 102 may view a dashboard that provides analytics information including a visual listing of one or more briefings that may have been scheduled and/or posted to the smart speaker media network of the smart speaker devices 110. As shown in FIG. 9, each of the briefings in the list may have a thumbnail photo, a title, a description, click or interaction information, top country of interaction information, revenue information, and time of day engagement information, e.g., a most popular time of the day in a particular area, a particular country, or globally. In addition, the dashboard may provide a number of followers associated with the skill or app, a number of clicks or interactions for the skill or app, a map showing top countries that have followers that have interacted with the skill or app, demographic information for the skill or app, a number of sessions for the skill or app including a number of sessions per day, gender statistics for the skill or app including a graph that indicates a percentage of users by gender, and audience information such as information associated with demographics of the skill or app by age bracket as well as a percentage of each gender in each age bracket, among other information.

Figure 10:
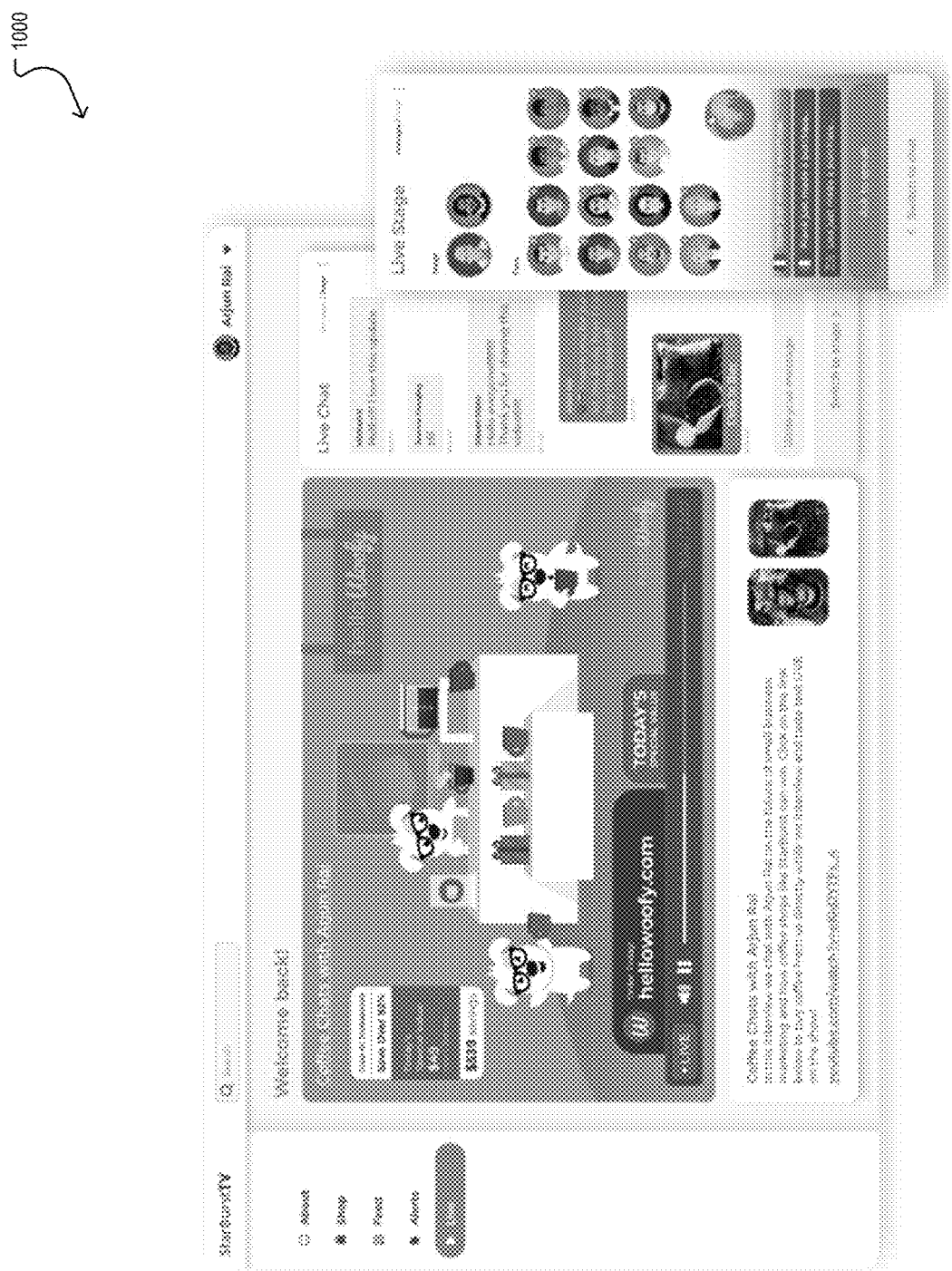
FIG. 10 illustrates an example user interface displayed by the client computing device according to an example embodiment.

FIG. 10 shows an example user interface 1000 of the smart speaker scheduler application 108 displayed by the client computing device 102 according to an example embodiment. As shown in FIG. 10, a user of a smart speaker device 110 may view the graphical user interface (GUI) on a display of the smart speaker device 110 or another display device that may be connected with or in communication with the smart speaker device. The GUI may be provided by or associated with the skill or app that may have been generated by the application/skill creator module 204. As shown in FIG. 10, there may one or more items or services that may be available for purchase by the user of the smart speaker device 110. In addition, each of the users in the smart speaker media network 110 may communicate with one another using a chat interface provided on the display of their smart speaker device 110. In addition, each of the users in the smart speaker media network 110 may view a feed associated with the skill or app. In addition to providing the scheduled briefings, the smart speaker device 110 may display a live briefing provided by the skill or app that may provide a realtime briefing that may include audio and/or video provided by the user of the client computing device 102. In addition, as shown in FIG. 10, the GUI may include a live stage section that may include one or more presenters on a stage as well as a representative logo or avatar for each presenter, one or more fans as well as a representative logo or avatar for each fan, as well as realtime information including one or more purchases of items or services. The live stage section also may include a user interface element that may allow a user to ask to speak or present to the audience of the smart speaker devices 110.

Figure 11:
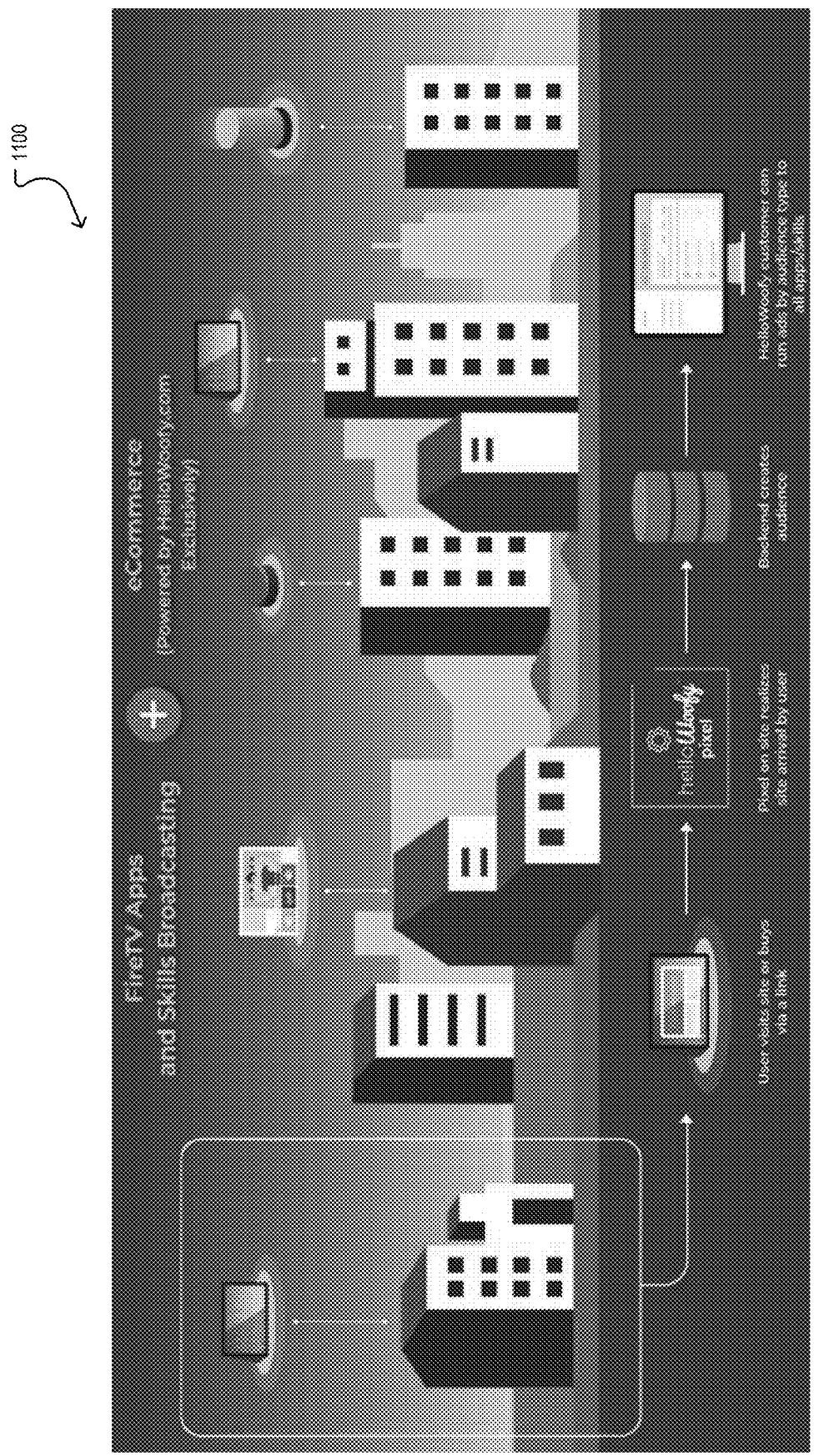
FIG. 11 illustrates an example user interface displayed by the client computing device according to an example embodiment.

FIG. 11 shows an example of the smart speaker media network provided by the smart speaker media network system 100 according to an example embodiment. As shown in FIG. 11, a first owner of a creator of a first skill or app may provide one or more briefings that may include audio information that may be broadcast by the first skill or app to an audience associated with a smart speaker media network of smart speaker devices 110. In one example, a user of one of the smart speaker devices 110 may consume the one or more briefings and may visit a URL associated with the one or more briefings. The user of the smart speaker device 110 may purchase a device or service associated with the URL. The smart speaker scheduler application 108 may track the user and determine an audience associated with the first skill or app. The smart speaker application 108 may determine other users or another audience that may be interested in the first skill or app. The first owner or creator of the first skill or app may advertise to the other users or other audience that may be interested in the first skill or app. As an example, the smart speaker scheduler application 108 may insert one or more briefings associated with the first skill or app between one or more briefings associated with a second skill or app. An example of an order of the briefings associated with the first skill or app and the second skill or app is shown in FIG. 3 and described above.

Figure 12:
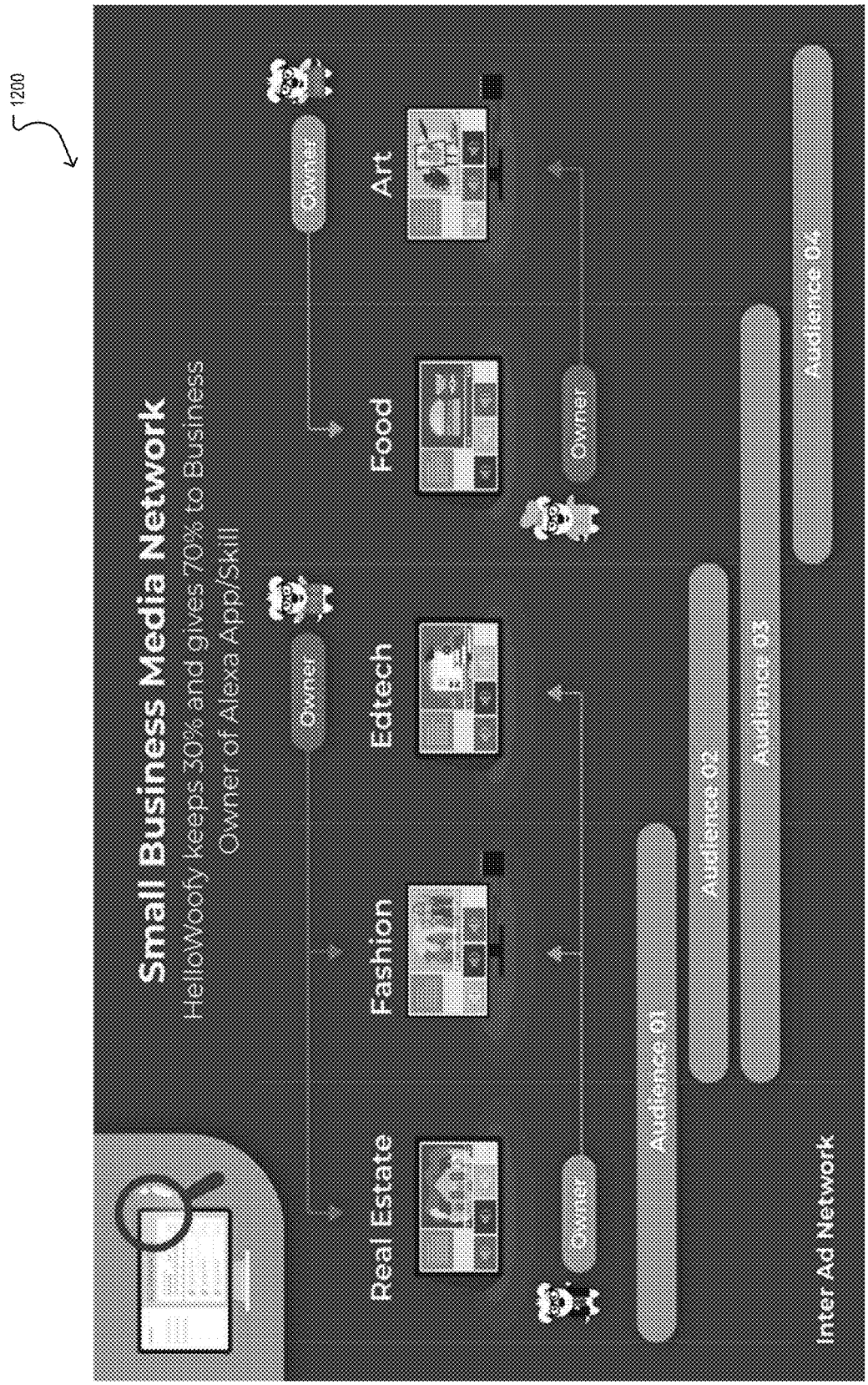
FIG. 12 illustrates an example user interface displayed by the client computing device according to an example embodiment.

FIG. 12 shows another example of the smart speaker media network provided by the smart speaker media network system 100 according to an example embodiment. As shown in FIG. 12, a first owner or creator of a first skill or app may be associated with the real estate industry. An audience of the first skill or app may also be interested in fashion. The owner or creator of the first skill or app may broadcast their one or more briefings to those interested in real estate, fashion, and edtech.

A second audience may be interested in fashion and edtech. A third audience may be interested in fashion, edtech, and food. A fourth audience may be interested in food and art. As shown in FIG. 12, there is overlap between the first audience and the second audience, overlap between the second audience and the third audience, and overlap between the third audience and the fourth audience.

A second owner or creator of a second skill or app may broadcast their one or more briefings to users that have shown interest or are interested in edtech, fashion, and real estate. A third owner or creator of a third skill or app may broadcast their one or more briefings to users that have shown interest or are interested in food and art. A fourth owner or creator of a fourth skill or app may broadcast their one or more briefings to users that have shown interest or are interested in art and food. The server computing device 104 may determine the first audience, the second audience, the third audience, and the fourth audience based on the analytics and tracking information.

Figure 13:
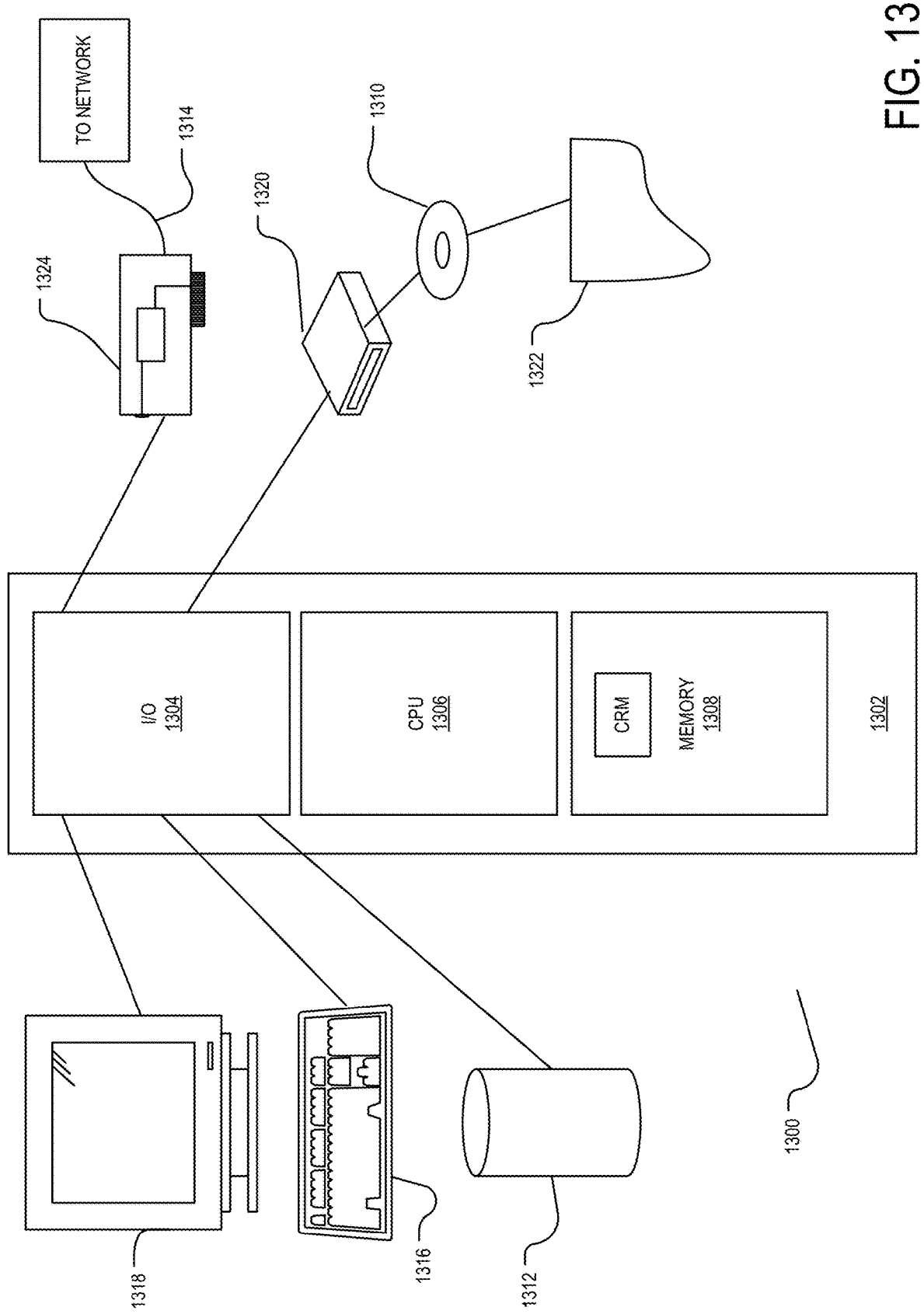
FIG. 13 illustrates a block diagram of a computing device according to an example embodiment.

FIG. 13 illustrates an example computing system 1300 that may implement various systems, such as the client computing device 102, the server computing device 104, and the smart speaker device 110 and the methods discussed herein, such as process 400 and process 460. A general purpose computer system 1300 is capable of executing a computer program product to execute a computer process. Data and program files may be input to the computer system 1300, which reads the files and executes the programs therein such as the smart speaker scheduler application 108. Some of the elements of a general purpose computer system 1300 are shown in FIG. 13 wherein a processor 1302 is shown having an input/output (I/O) section 1304, a central processing unit (CPU) 1306, and a memory section 1308. There may be one or more processors 1302, such that the processor 1302 of the computer system 1300 comprises a single central-processing unit 1306, or a plurality of processing units, commonly referred to as a parallel processing environment. The computer system 1300 may be a conventional computer, a server, a distributed computer, or any other type of computer, such as one or more external computers made available via a cloud computing architecture. The presently described technology is optionally implemented in software devices loaded in memory 1008, stored on a configured DVD/CD-ROM 1310 or storage unit 1312, and/or communicated via a wired or wireless network link 1314, thereby transforming the computer system 1300 in FIG. 13 to a special purpose machine for implementing the described operations.

The memory section 1308 may be volatile media, nonvolatile media, removable media, non-removable media, and/or other media or mediums that can be accessed by a general purpose or special purpose computing device. For example, the memory section 1308 may include non-transitory computer storage media and communication media. Non-transitory computer storage media further may include volatile, nonvolatile, removable, and/or non-removable media implemented in a method or technology for the storage (and retrieval) of information, such as computer/machine-readable/executable instructions, data and data structures, engines, program modules, and/or other data. Communication media may, for example, embody computer/machine-readable/executable, data structures, program modules, algorithms, and/or other data. The communication media may also include an information delivery technology. The communication media may include wired and/or wireless connections and technologies and be used to transmit and/or receive wired and/or wireless communications.

The I/O section 1304 is connected to one or more user-interface devices (e.g., a keyboard 1316 and a display unit 1318), a disc storage unit 1312, and a disc drive unit 1320. Generally, the disc drive unit 1320 is a DVD/CD-ROM drive unit capable of reading the DVD/CD-ROM medium 1310, which typically contains programs and data 1322. Computer program products containing mechanisms to effectuate the systems and methods in accordance with the presently described technology may reside in the memory section 1308, on a disc storage unit 1312, on the DVD/CD-ROM medium 1310 of the computer system 1300, or on external storage devices made available via a cloud computing architecture with such computer program products, including one or more database management products, web server products, application server products, and/or other additional software components. Alternatively, a disc drive unit 1320 may be replaced or supplemented by another storage medium drive unit. The network adapter 1324 is capable of connecting the computer system 1300 to a network via the network link 1314, through which the computer system can receive instructions and data. Examples of such systems include personal computers, Intel or PowerPC-based computing systems, AMD-based computing systems, ARM-based computing systems, and other systems running a Windows-based, a UNIX-based, or other operating system. It should be understood that computing systems may also embody devices such as Personal Digital Assistants (PDAs), mobile phones, tablets or slates, multimedia consoles, gaming consoles, set top boxes, etc.

When used in a LAN-networking environment, the computer system 1300 is connected (by wired connection and/or wirelessly) to a local network through the network interface or adapter 1324, which is one type of communications device. When used in a WAN-networking environment, the computer system 1300 typically includes a modem, a network adapter, or any other type of communications device for establishing communications over the wide area network. In a networked environment, program modules depicted relative to the computer system 1300 or portions thereof, may be stored in a remote memory storage device. It is appreciated that the network connections shown are examples of communications devices for and other means of establishing a communications link between the computers may be used.

In an example implementation, source code executed by the client computing device 102, source code executed by the server computing device 104, source code executed by the smart speaker device 110, a plurality of internal and external databases, source databases, and/or cached data on servers are stored in memory of the client computing device 102, memory of the server computing device 104, memory of the smart speaker device 110, or other storage systems, such as the disk storage unit 1312 or the DVD/CD-ROM medium 1310, and/or other external storage devices made available and accessible via a network architecture. The source code executed by the client computing device 102, the server computing device 104, and the smart speaker device 110 may be embodied by instructions stored on such storage systems and executed by the processor 1302.

Some or all of the operations described herein may be performed by the processor 1302, which is hardware. Further, local computing systems, remote data sources and/or services, and other associated logic represent firmware, hardware, and/or software configured to control operations of the smart speaker media network system 100 and/or other components. Such services may be implemented using a general purpose computer and specialized software (such as a server executing service software), a special purpose computing system and specialized software (such as a mobile device or network appliance executing service software), or other computing configurations. In addition, one or more functionalities disclosed herein may be generated by the processor 1302 and a user may interact with a Graphical User Interface (GUI) using one or more user-interface devices (e.g., the keyboard 1316, the display unit 1318, and other user-interface devices in communication with the I/O section 1304) with some of the data in use directly coming from online sources and data stores. The system set forth in FIG. 13 is but one possible example of a computer system that may be employed or be configured in accordance with aspects of the present disclosure.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon executable instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may include, but is not limited to, magnetic storage medium, optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic executable instructions.

The description above includes example systems, methods, techniques, instruction sequences, and/or computer program products that embody techniques of the present disclosure. However, it is understood that the described disclosure may be practiced without these specific details.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A system comprising:
a memory; and
at least one processor to execute computer-executable instructions stored in the memory to:
receive smart speaker skill/application generation information from a client computing device and generate a first smart speaker skill or application using the smart speaker skill/application generation information;
receive at least one scheduled post from the client computing device to schedule at least one briefing at a scheduled time to be broadcast to a first plurality of smart speaker devices having the first smart speaker skill or application;
broadcast the at least one briefing associated with the first smart speaker skill or application to the first plurality of smart speaker devices at the scheduled time;
receive tracking and analytics information from each smart speaker in the first plurality of smart speaker devices having the first smart speaker skill or application; and
determine an audience for the at least one briefing comprising the first plurality of smart speaker devices having the first smart speaker skill or application and a second plurality of smart speaker devices having a second smart speaker skill or application different from the first smart speaker skill or application based on the tracking and analytics information.

2. The system of claim 1, the at least one processor further to broadcast the at least one briefing associated with the first smart speaker skill or application to the second plurality of smart speaker devices having the second smart speaker skill or application.

3. The system of claim 1, the at least one processor further to broadcast the at least one briefing associated with the first smart speaker skill or application to the second plurality of smart speaker devices having the second smart speaker skill or application after broadcasting the at least one briefing associated with the second smart speaker skill or application.

4. The system of claim 1, the at least one processor further to broadcast the at least one briefing associated with the first smart speaker skill or application to the second plurality of smart speaker devices having the second smart speaker skill or application before broadcasting the at least one briefing associated with the second smart speaker skill or application.

5. The system of claim 1, the at least one processor further to broadcast a first briefing of the at least one briefing associated with the second smart speaker skill or application to the second plurality smart speaker devices having the second smart speaker skill or application, broadcast at least one briefing associated with the first smart speaker skill or application to the second plurality of smart speaker devices having the second smart speaker skill or application, and broadcast a second briefing of the least one briefing associated with second smart speaker skill or application to the second plurality of smart speaker devices having the second smart speaker skill or application.

6. The system of claim 1, the at least one processor further to broadcast the at least one briefing associated with the first smart speaker skill or application in realtime.

7. The system of claim 1, the at least one processor further to determine at least one of a number of interactions with the at least one briefing associated with the first smart speaker skill or application, a top geographic region that interacted with the at least one briefing associated with the first smart speaker skill or application, and a most popular time of engagement for the at least one briefing associated with the first smart speaker skill or application.

8. A method comprising:
receiving, by at least one processor, smart speaker skill/application generation information from a client computing device and generating a first smart speaker skill or application using the smart speaker skill/application generation information;
receiving, by the at least one processor, at least one scheduled post from the client computing device to schedule at least one briefing at a scheduled time to be broadcast to a first plurality of smart speaker devices having the first smart speaker skill or application;
broadcasting, by the at least one processor, the at least one briefing associated with the first smart speaker skill or application to the first plurality of smart speaker devices at the scheduled time;
receiving, by the at least one processor, tracking and analytics information from each smart speaker in the first plurality of smart speaker devices having the first smart speaker skill or application; and
determining, by the at least one processor, an audience for the at least one briefing comprising the first plurality of smart speaker devices having the first smart speaker skill or application and a second plurality of smart speaker devices having a second smart speaker skill or application different from the first smart speaker skill or application based on the tracking and analytics information.

9. The method of claim 8, further comprising broadcasting the at least one briefing associated with the first smart speaker skill or application to the second plurality of smart speaker devices having the second smart speaker skill or application.

10. The method of claim 8, further comprising broadcasting the at least one briefing associated with the first smart speaker skill or application to the second plurality of smart speaker devices having the second smart speaker skill or application after broadcasting the at least one briefing associated with the second smart speaker skill or application.

11. The method of claim 8, further comprising broadcasting the at least one briefing associated with the first smart speaker skill or application to the second plurality of smart speaker devices having the second smart speaker skill or application before broadcasting the at least one briefing associated with the second smart speaker skill or application.

12. The method of claim 8, further comprising broadcasting a first briefing of the at least one briefing associated with the second smart speaker skill or application to the second plurality smart speaker devices having the second smart speaker skill or application, broadcasting at least one briefing associated with the first smart speaker skill or application to the second plurality of smart speaker devices having the second smart speaker skill or application, and broadcasting a second briefing of the least one briefing associated with second smart speaker skill or application to the second plurality of smart speaker devices having the second smart speaker skill or application.

13. The method of claim 8, further comprising broadcasting the at least one briefing associated with the first smart speaker skill or application in realtime.

14. The method of claim 8, further comprising determining at least one of a number of interactions with the at least one briefing associated with the first smart speaker skill or application, a top geographic region that interacted with the at least one briefing associated with the first smart speaker skill or application, and a most popular time of engagement for the at least one briefing associated with the first smart speaker skill or application.

15. A non-transitory computer-readable storage medium, having instructions stored thereon that, when executed by a computing device cause the computing device to perform operations, the operations comprising:
receiving smart speaker skill/application generation information from a client computing device and generating a first smart speaker skill or application using the smart speaker skill/application generation information;
receiving at least one scheduled post from the client computing device to schedule at least one briefing at a scheduled time to be broadcast to a first plurality of smart speaker devices having the first smart speaker skill or application;
broadcasting the at least one briefing associated with the first smart speaker skill or application to the first plurality of smart speaker devices at the scheduled time;
receiving tracking and analytics information from each smart speaker in the first plurality of smart speaker devices having the first smart speaker skill or application; and
determining an audience for the at least one briefing comprising the first plurality of smart speaker devices having the first smart speaker skill or application and a second plurality of smart speaker devices having a second smart speaker skill or application different from the first smart speaker skill or application based on the tracking and analytics information.

16. The non-transitory computer-readable medium of claim 15, the operations further comprising broadcasting the at least one briefing associated with the first smart speaker skill or application to the second plurality of smart speaker devices having the second smart speaker skill or application.

17. The non-transitory computer-readable medium of claim 15, the operations further comprising broadcasting the at least one briefing associated with the first smart speaker skill or application to the second plurality of smart speaker devices having the second smart speaker skill or application after broadcasting the at least one briefing associated with the second smart speaker skill or application.

18. The non-transitory computer-readable medium of claim 15, the operations further comprising broadcasting the at least one briefing associated with the first smart speaker skill or application to the second plurality of smart speaker devices having the second smart speaker skill or application before broadcasting the at least one briefing associated with the second smart speaker skill or application.

19. The non-transitory computer-readable medium of claim 15, the operations further comprising broadcasting a first briefing of the at least one briefing associated with the second smart speaker skill or application to the second plurality smart speaker devices having the second smart speaker skill or application, broadcasting at least one briefing associated with the first smart speaker skill or application to the second plurality of smart speaker devices having the second smart speaker skill or application, and broadcasting a second briefing of the least one briefing associated with second smart speaker skill or application to the second plurality of smart speaker devices having the second smart speaker skill or application.

20. The non-transitory computer-readable medium of claim 15, the operations further comprising broadcasting the at least one briefing associated with the first smart speaker skill or application in realtime.

\* \* \* \* \*